United States Patent [19]
Scharpf

[11] 3,839,340
[45] Oct. 1, 1974

[54] SUBSTITUTED 1,3,8-TRIAZASPIRO[4.5]DECANES

[75] Inventor: William George Scharpf, Pasadena, Md.

[73] Assignee: FMC Corporation, New York, N.Y.

[22] Filed: Sept. 27, 1968

[21] Appl. No.: 763,417

[52] U.S. Cl............................. 260/293.66, 260/999
[51] Int. Cl...................... C07d 29/18, C07d 29/20
[58] Field of Search....... 260/293.4, 294 AC, 294.7, 260/293.66

[56] References Cited
UNITED STATES PATENTS
3,238,216   3/1966   Janssen .................... 260/294 AC X

*Primary Examiner*—Leland A. Sebastian

[57] ABSTRACT

1,3,8-Triazaspiro[4.5] decanes containing a carbamoyl or thiocarbamoyl function at the 3-position, exhibit pronounced neuroleptic activity. The compounds are prepared by reacting the requisite 3-unsubstituted 1,3,8-triazaspiro [4.5] decane with the corresponding carbamoylating agent in the presence of a strong base.

5 Claims, No Drawings

SUBSTITUTED 1,3,8-TRIAZASPIRO[4.5]DECANES

BACKGROUND OF THE INVENTION

A. Field of the Invention

This invention relates to neuroleptically active 1,3,8-triazaspiro-[4.5]decanes, particularly those having a carbamoyl or thiocarbamoyl group in the 3-position. The invention also pertains to the preparation of the aforenamed compounds and to pharmaceutical compositions containing them.

B. Description of the Prior Art 1,3,8-Triazaspiro[4.5]decane is the class name applied to the organic ring system (I)

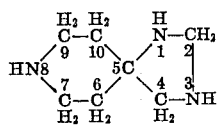

It is known only in the form of various derivatives. These are prepared by reacting a 4-piperidone or an alkali metal 4-hydroxypiperidine-4-sulfonate wherein the piperidyl nitrogen is protected by, for instance, a benzyl group; with a primary amine and an alkali metal cyanide whereby there is introduced into the 4-position of the piperidine ring, a nitrile and secondary amino group. The reaction is commonly conducted in an aqueous alcohol system in the presence of one equivalent of hydrochloric acid or in an aqueous organic carboxylic acid system such as acetic acid. The resulting product is then treated with a strong mineral acid such as hydrochloric acid, phosphoric acid or preferably sulfuric acid to effect hydrolysis of the cyano group to the corresponding amide function. The resulting carboxamidopiperidine is condensed with formamide in the presence of an inorganic acid such as sulfuric acid to bring about cyclization to the 2,4,8-triazaspiro[4.5]decane. Where the cyclization is carried out with an intermediate in which the secondary amino group is alkylamino, one commonly ends up with a corresponding 1,3,8-triazaspiro[4.5]dec-2-ene; an arylamino group, on the other hand, results in the saturated 1,3,8-triazaspiro[4.5]decane. The decene can be reduced to the decane by typical reduction procedures and materials, and in this connection lithium aluminum hydride or sodium aluminum hydride are both effective and convenient reducing agents. Another method for ring closing the carboxamidopiperidine is to treat it with an acylating agent, particularly an anhydride of an aliphatic carboxylic acid of low molecular weight. This procedure results in the unsaturated 1,3,8-triazaspiro[4.5]dec-2-ene having in the 1-position thereof, a substituent identical to the aliphatic carboxylic acid residue of the particular anhydride employed.

A benzyl group may be used to protect the piperidyl nitrogen during the early stages of the synthesis and later can be removed and replaced by other substituents. For further details on the synthesis of 4-oxo-1,3,8-triazaspiro[4.5]decanes, the technical and chemical literature should be consulted, and in this connection reference is made to U.S. Pat. No. 3,155,670 to Janssen and *J. Org. Chem.*, 26, 4480 (1961).

An interesting class of 1,3,8-triazaspiro[4.5]decanes is described in the aforementioned U.S. Pat. to Janssen. These compounds, which exhibit neuroleptic activity are 4-oxo-1,3,8-triazaspiro[4.5]decanes having attached to the 1 and 8 positions, respectively, a hydrocarbon group and a benzoylalkyl group. In some instances the 3-position carries a lower alkyl or acyl moiety. The configuration of the Janssen compounds is more readily visualized by reference to the following general formula:

(II)

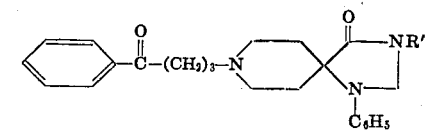

wherein R' represents hydrogen or lower alkyl.

A class of 1,3,8-triazaspiro[4.5]decanes having even more pronounced neuroleptic activity are disclosed and claimed in pending application Ser. No. 556,854, filed June 13, 1966, in the name of William G. Scharpf. These compounds are ketals of 8-(3-aroylpropyl)-4-oxo-1-phenyl-1,3,8-triazaspiro[4.5]decanes having a lower aliphatic hydrocarbon group located on the 3-position.

SUMMARY OF THE INVENTION

We have now discovered a further new class of 1,3,8-triazaspiro-[4.5]decanes which are neuroleptically active, characterized by the presence of a 3-N-loweralkyl-carbamoyl function and having the following formula:

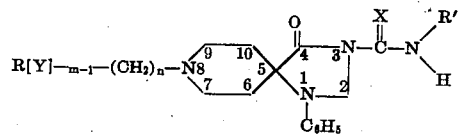

wherein R' represents a lower alkyl group of one to two carbon atoms; X is a chalcogen as represented by oxygen or sulfur; n is an integer of from 0 to 3; m is an integer of from 1 to 2; Y is an aliphatic divalent radical as represented by

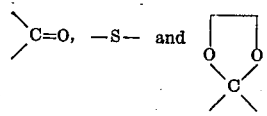

and R is 4-fluorophenyl, 2-thienyl, phenyl, ethynyl and

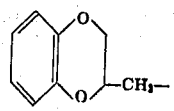

DESCRIPTION OF THE INVENTION AND THE PREFERRED EMBODIMENTS

The compounds of the invention are realized by a two-step synthesis wherein the N-loweralkylcarbamoyl function or its thioanalog is introduced into the 3-position of the 4-oxo-1-phenyl-1,3,8-triazaspiro[4.5]decane in which the nitrogen atom in the 8-position is protected by benzyl substitution and subsequent hydrogenolysis to remove the benzyl group followed by realkylation of the free 8-position with the appropriate alkyl halide. These steps can be conducted also in reverse order in which case the carbamoyl or thiocarbamoyl substituent is introduced after alkylation. The following equations summarize the course of these reactions wherein the alkylation step is carried out as the last step and using an aromatic N-loweralkylcarbamate as the source of the N-loweralkylcarbamate function:

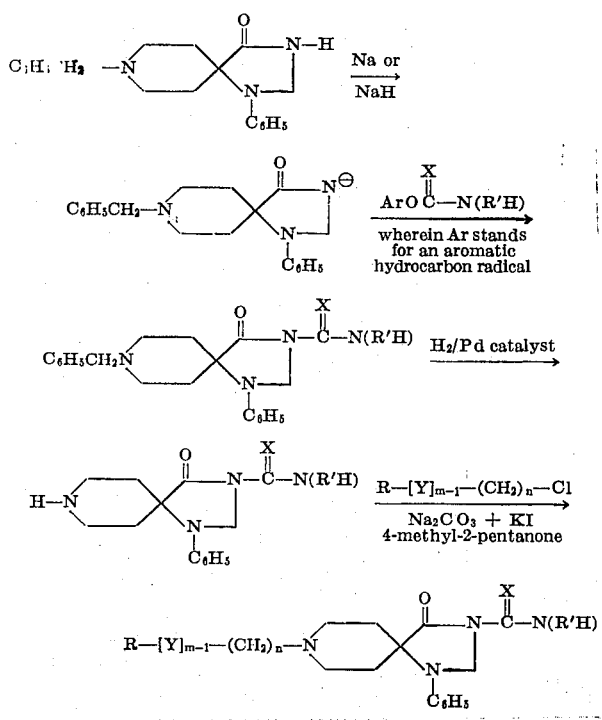

wherein R, R', X, Y, n and m have the values previously assigned.

In preparing the compounds herein, generally satisfactory results are attained by reacting the 8-benzyl-4-oxo-1-phenyl-1,3,8-triazaspiro[4.5]-decane with a strong base or an alkali metal and the resulting anion condensed with an aromatic N-loweralkylcarbamate such as the phenyl N-lowercarbamate in order to introduce the N-loweralkylcarbamoyl function in the 3-position. Examples of strong bases are the alkali metal hydrides, preferably sodium hydride; sodium is the desired alkali metal. The reaction is preferably performed in a solvent of the normally liquid, relatively inert organic type such as the liquid saturated aliphatic or aromatic hydrocarbons, particularly benzene or toluene.

The resulting 8-benzyl-3-N-loweralkylcarbamoyl-4-oxo-1-phenyl-1,3,8-triazaspiro[4.5]decane is subjected to hydrogenolysis to effect removal of the protecting benzyl group. Hydrogenolysis is preferably carried out using a reductive catalyst such as Raney nickel or palladium in the presence of a non-interferring solvent of which the saturated aliphatic alcohols, e.g., ethanol, are especially suitable and convenient.

The debenzylated 1,3,8-triazaspiro[4.5]decane is then alkylated with the appropriate alkyl halide to effect introduction of the desired substituent on the piperidine nitrogen atom at the 8-position. The alkylation is of general scope and applicability and is readily performed by heating, at mildly elevated temperatures, essentially stoichiometric amounts of the reactants and base in the presence of a normally liquid organic solvent; temperatures range from about room temperature to about 250°C. Generally speaking, excellent results are achieved by refluxing a mixture of solvent and reactants for a period of from a few minutes to about three hours. A trace of an alkali metal iodide, e.g., sodium or potassium iodide, facilitates the reaction. Examples of suitable bases include both mineral and organic types as exemplified by tertiary organic amines such as pyridine, quinoline, triethylamine, triethylenediamine, trimethylamine and the like, while typical mineral bases are represented by the alkali metal carbonates of which sodium or potassium carbonate is most convenient and preferable. Isolation and purification of the final product is effected by the usual organic techniques such as crystallization, sublimation, and the like.

For the most part, the alkyl halide intermediates comprise a class of known chemical entities, the description and preparation of which re given in the technical literature. Where a particular member has not been previously disclosed, it is obtained by synthetic procedures used in preparing known analogous derivatives. For instance, the ketal-containing alkyl halide is formed using a procedure patterned after the reaction disclosed in Ber., 40, 3903 (1907) and Ber., 72, 600 (1939). Such materials are produced by reacting the requisite ketone with the appropriate alcohol or glycol in the presence of p-toluenesulfonic acid or other acidic material and isolating the resultant ketal. Further details on the preparation of these compounds can be obtained by consulting the aforesaid references. As a general source for information on these alkyl halides, mention is hereby made of "Chemical Abstracts" which is published by the American Chemical Society.

The 1,3,8-triazaspiro[4.5]decanes herein are pharmacologically active substances, being particularly effective as neuroleptics. They comprise a class of powerful medicaments of the tranquilizer type useful in treating various mental and central nervous system disorders.

As can be seen from their formulae the compounds of this invention are organic bases and as such form pharmaceutically acceptable salts with a variety of inorganic and strong organic acids including sulfuric, phosphoric, hydrochloric, hydrobromic, hydroiodic, sulfamic, citric, lactic, maleic, malic, succinic, tartaric, cinnamic, acetic, benzoic, gluconic, ascorbic, and related acids. They also form quarternary ammonium salts with a variety of organic esters of sulfuric, hydrohalic and aromatic sulfonic acids. Among such esters are methyl chloride and bromide, ethyl chloride, propyl chloride, butyl chloride, isobutyl chloride, benzyl chloride and bromide, phenethyl bromide, naphthylmethyl chloride, dimethyl sulfate, diethyl sulfate, methyl benzenesulfonate, ethyl toluenesulfonate, ethylene chlorohydrin, propylene chlorohydrin, allyl bromide, methally bromide and crotyl bromide.

As those skilled in the art are aware, pharmaceutically active organic bases are commonly administered to the subject organism as an isotonic solution of their acid addition salts of the type above enunciated. The active bases or their addition salts can be administered to the subject animal in combination with any of the carriers or solvents known in the art for this purpose.

The invention is illustrated in greater detail by the following nonlimiting examples.

EXAMPLE 1

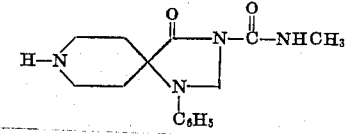

A mixture of 18.9 g. (0.05M) of 3-(N-methylcarbamoyl)-4-oxo-8-benzyl-1-phenyl-1,3,8-triazaspiro[4.5]decane, 2.0 g. of 5 percent palladium on carbon, and 250 ml. of ethanol were hydrogenated at 55°C and 55 p.s.i. in a Parr apparatus. Take up after 16 hours was 3.5 p.s.i. The catalyst was removed by filtration through celite, and the solvent was evaporated under reduced pressure to give 15.4 g. of clear oil which crystallized on standing. Recrystallization from methylcyclohexane gave 13.2 g. of crystalline solid, m.p. 118°–120°C. A second recrystallization from the same solvent gave an analytical sample.

Anal. Calcd. for $C_{15}H_{20}N_4O_2$: C, 62.48; H, 6.99; N, 19.43. Found: C, 62.58; H, 7.07; N, 19.48.

EXAMPLE 2

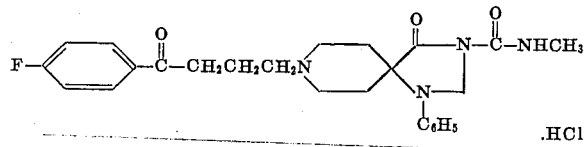

A mixture of 2.9 g. (0.01 M) of 3-(N-methylcarbamoyl)-4-oxo-1-phenyl-1,3,8-triazaspiro[4.5]decane, 2.0 g. (0.01 M) of γ-chloro-p-fluorobutyrophenone, 3.2 g. (0.03M) of sodium carbonate, and 0.1 g. of potassium iodide was refluxed in 125 ml. of 4-methyl-2-pentanone for 70 hours. The reaction mixture was cooled, washed twice with water, once with saturated sodium chloride solution, and dried over anhydrous magnesium sulfate. The desiccant was removed by filtration and the filtrate was evaporated in vacuo to yield 4.18 g. of orange oil. This was boiled with 2-butanone and filtered to remove insoluble solids. The solvent was evaporated to dryness, and the residue was dissolved in 50 ml. of tetrahydrofuran. To this was added a saturated solution of hydrochloric acid in ether. The precipitated hydrochloride salt was collected. Recrystallization from ethyl acetate gave 1.42 g. of solid, m.p. 225°C (decomp.). Concentration of the mother liquor gave a second crop, 0.2 g., m.p. 218°C (decomp.).

Anal. Calcd. for $C_{25}H_{30}ClFN_4O_3$: C, 61.40; H, 6.19; N, 11.46. Found C, 61.30; H, 6.35; N, 11.02.

Example 3

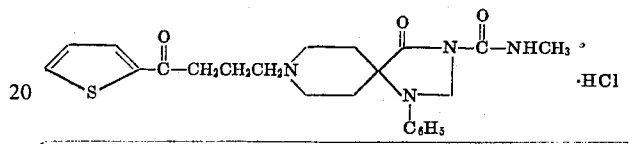

A mixture of 2.9 g. (0.01 M) of 3-(N-methylcarbamoyl)-4-oxo-1-phenyl-1,3,8-triazaspiro[4.5]decane, 1.9 g. (0.01 M) of γ-chlorobutyrothienone, 3.2 g. (0.03 M) of sodium carbonate, and 0.1 g. of potassium iodide was refluxed in 125 ml. of 4-methyl-2-pentanone for 65 hours. The reaction was cooled to room temperature and filtered to remove the solid material. The filtrate was washed twice with water, once with saturated sodium chloride solution, and dried over anhydrous magnesium sulfate. The drying agent was removed by filtration and the filtrate was evaporated under reduced pressure to yield 4.85 g. of an orange oil. Chromatography on alumina and elution with 5 percent methanol in ether gave 2.3 g. of an oil which upon dissolution in tetrahydrofuran and addition to a saturated ethereal solution of hydrochloric acid precipitated the desired hydrochloride salt, 1.57 g., m.p. 239°–240°C. (decomp.).

Anal. Calcd. for $C_{23}H_{23}H_{29}ClN_4O_3S$: C, 57.90; H, 6.13; N, 11.75. Found: C, 58.01; H, 6.27; N, 11.79.

EXAMPLE 4

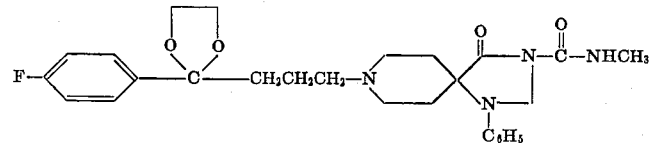

A mixture of 2.9 g. (0.01 M) of 3-(N-methylcarbamoyl)-4-oxo-1-phenyl-1,3,8-triazaspiro[4.5]decane, 2.5 g. (0.01 M) of 2-(p-fluorophenyl)-2-(3-chloropropyl)-1,3-dioxolane, 3.2 g. (0.03 M) of sodium carbonate, and 0.1 g. of potassium iodide was refluxed in 125 ml. of 4-methyl-2-pentanone for 66 hours. The reaction mixture was cooled and filtered to remove the solid material. The filtrate was washed twice with water, once with saturated sodium chloride solution, and dried over anhydrous sodium sulfate. The drying agent was removed by filtration and the filtrate was evaporated in vacuo to give 5.66 g. of an orange oil. This was dissolved in 10 ml. of tetrahydrofuran and added dropwise to a stirred solution of 1.3 g. of fumaric acid in 30 ml. of tetrahydrofuran. A precipitate formed immediately and was filtered yielding 3.10 g. of white solid, m.p. 182°–183.5°C (decomp.). Recrystallization from ethanol afforded an analytical sample.

Anal. Calcd. for C₃₁H₃₇FN₄O₈: C, 80; H, 6.08; N, 9.15. Found: C, 60.97; H, 6.34; N, 9.07.

EXAMPLE 5

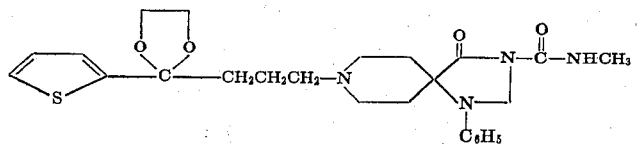

A mixture of 2.9 g. (0.01 M) of 3-(N-methylcarbamoyl)-4-oxo-1-phenyl-1,3,8-triazaspiro[4.5]decane, 2.4 g. (0.01 M) of 2-(2-thienyl)-2-(3-chloropropyl)-1,3-dioxolane, 3.2 g. (0.03 M) of sodium carbonate, and 0.1 g. of potassium iodide was refluxed in 125 ml. of 4-methyl-2-pentanone for 64 hours. The reaction mixture was cooled and filtered to remove the solid material. The filtrate was washed two times with water, once with saturated sodium chloride solution, and dried over anhydrous sodium sulfate. The drying agent was removed by filtration and the filtrate was evaporated under reduced pressure to yield 5.90 g. of an orange oil. This material was dissolved in 10 ml. of tetrahydrofuran and added dropwise to a stirred solution of 1.2 g. of fumaric acid in 30 ml. of tetrahydrofuran. A precipitate formed immediately and was filtered off to give 3.84 g. of white solid, m.p. 206°–208°C (decomp.). Recrystallization from ethanol gave an analytical sample.

Anal. Calcd. for C₂₉H₃₆N₄O₈S: C, 58.01; H, 6.04; N, 9.34. Found: C, 57.87; H, 6.07; N, 9.14.

Following the procedure of the previous examples the following compounds were prepared.

| Example | 8-substituent | X | R' |
|---|---|---|---|
| 6 | F—C₆H₄—C(O)—CH₂CH₂CH₂— | O | —CH₃ |
| 7 | thienyl—C(O)—CH₂CH₂CH₂— | O | —CH₃ |
| 8 | F—C₆H₄—C(dioxolane)—CH₂CH₂CH₂— | O | —CH₃ |
| 9 | thienyl—C(dioxolane)—CH₂CH₂CH₂— | O | —CH₃ |

In all of the examples, the requisite 3-(N-methylcarbamoyl)-4-oxo-8-benzyl-1-phenyl-1,3,8-triazaspiro[4.5]decane was obtained by heating the sodium salt of 8-benzyl-4-oxo-1-phenyl-1,3,8-triazaspiro[4.5]decane with phenyl N-methylcarbamate in benzene and isolating the product by crystallization from an organic solvent.

What is claimed is:

1. A compound of the formula

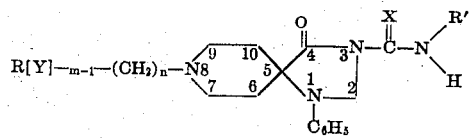

wherein R' represents an alkyl group of one to two carbon atoms, and X is a chalcogen selected from the class consisting of oxygen and sulfur; $n$ is an integer from 0 to 3; $m$ is an integer of from 1 to 2; Y is an aliphatic divalent radical selected from the class consisting of

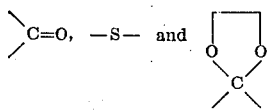

and R is selected from the class consisting of 4-fluorophenyl, 2-thienyl, phenyl, ethynyl and

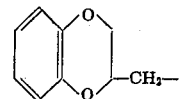

2. A compound of claim 1 having the formula:

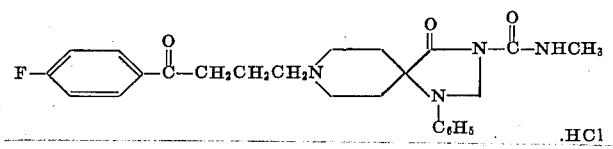

3. A compound of claim 1 having the formula:

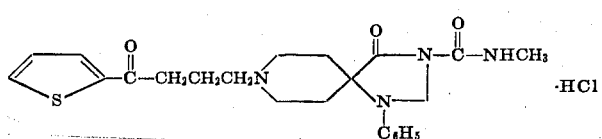

4. A compound of claim 1 having the formula:

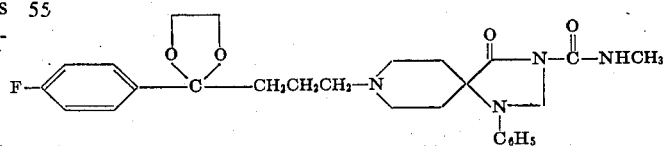

5. A compound of claim 1 having the formula:

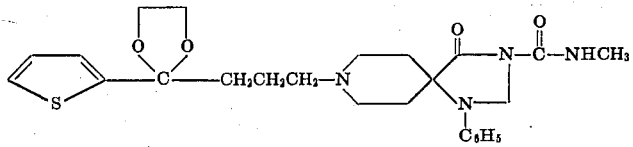

* * * * *